United States Patent [19]

Thony et al.

[11] Patent Number: 5,732,100
[45] Date of Patent: Mar. 24, 1998

[54] CAVITY FOR A SOLID MICROLASER HAVING AN OPTIMIZED EFFICIENCY, MICROLASER USING IT AND ITS PRODUCTION PROCESS

[75] Inventors: Philippe Thony; Engin Molva, both of Grenoble, France

[73] Assignee: Commissariat a l'Energie Atomique, Paris, France

[21] Appl. No.: 587,484

[22] Filed: Jan. 17, 1996

[30] Foreign Application Priority Data

Jan. 24, 1995 [FR] France ................... 95 00766

[51] Int. Cl.$^6$ ............................................. H01S 3/08
[52] U.S. Cl. ...................... 372/92; 372/99; 372/98; 372/108; 372/12
[58] Field of Search ..................... 372/99, 92, 98, 372/12, 108

[56] References Cited

U.S. PATENT DOCUMENTS

| | | |
|---|---|---|
| 5,249,189 | 9/1993 | Scheps . |
| 5,268,920 | 12/1993 | Esterowitz et al. . |
| 5,495,494 | 2/1996 | Molva et al. . |
| 5,502,737 | 3/1996 | Chartier et al. . |
| 5,559,823 | 9/1996 | Valette ................................ 372/92 |

FOREIGN PATENT DOCUMENTS 0 523861   1/1993   European Pat. Off. .

OTHER PUBLICATIONS

IEEE Journal of Quantum Electronics, vol. 28, No. 4, pp. 1139–1141, Apr. 1992, William J. Kozlovsky, et al., "Efficient Diode–Laser–Pumped 946 nm Nd: YAG Laser With Resonator–Enhanced Pump Absorption".

Optics Letters, vol. 17, No. 17, pp. 1201–1203, Sep. 1, 1992, J. J. Zayhowski, et al., "Diode–Pumped Microchip Lasers Electro–Optically Q Swithched at High Pulse Repetition Rates".

Mir Publications, pp. 42–55, 1982, By: Anaviev, "Resonateurs Optiques et leur classification" No Month.

Opto, No. 67, pp. 28–34, May/Jun. 1992, C. Liegois, "Les Optiques Holographiques".

Nouvelle Revue d'Optique Appliquee, vol. 1, No. 5, pp. 325–332, 1970, A. Bruel, et al., "Calcul Digital D'Hologrammes" No Month.

*Primary Examiner*—Leon Scott, Jr.
*Attorney, Agent, or Firm*—Oblon, Spivak, McClelland, Maier & Neustadt, P.C.

[57] ABSTRACT

The invention relates to a microlaser cavity having an active laser medium and reflection means at the entrance and exit of the cavity, characterized in that the reflection means are dimensioned in such a way that, in the active medium, the size of a pumping beam is at the most equal to the size of a laser beam emitted by the cavity.

24 Claims, 3 Drawing Sheets

CAVITY FOR A SOLID MICROLASER HAVING AN OPTIMIZED EFFICIENCY, MICROLASER USING IT AND ITS PRODUCTION PROCESS

DESCRIPTION

1. Technical Field

The present invention relates to the field of solid, optical pumping microlasers. The microlaser is a laser, whose laser material is a solid. The solid forming the amplifier of the laser cavity is excited by a light source (optical pumping). It can be crystalline (doped oxide crystal, semiconductor crystal, etc.) or amorphous (glass). The pumping photons are absorbed by the active laser centres, which can be introduced into the solid by doping in impurity form, or which are constituents of said solid. In the microlaser, the laser medium is longitudinally pumped, i.e. the pumping source is located on the axis of the laser and the axis of the pumping beam is the same as that of the laser beam.

The microlaser is in a single block of small size, the occupied volume being about 1 mm$^3$ or less. This small size permits its integration as a coherent light source into numerous systems. All the components of the microlaser are assembled in various ways so as to form a single monolithic component. As a result of this monolithic structure, the microlaser is a small, robust and fool-proof source, so that it is very reliable.

An important feature of the microlaser is its low manufacturing cost. The microlaser is an inexpensive source, because it can easily be mass produced. Thus, the microlaser is an assembly of layers of different thickness and type, stacked on one another in accordance with different procedures. The laser material can constitute the substrate. By using planar production methods, small, thin plates can be treated and then cut into a very large number of units. Thus, plates of a few hundred microns and several inches in diameter give a few thousand lasers. Using a single laser material ingot, it is possible to obtain several tens of thousands of microlasers. This mass production leads to a very low cost, which is a feature of the microlaser. To this cost must then be added that of the pumping source.

2. Prior Art

Microlasers using a resonant cavity with two plane mirrors are known and form the two polished, terminal faces of the microlaser. The problem of this structure is that the cavity with two plane mirrors is geometrically unstable. A stabilization appears, but this is due to effects of the variation of the index of the material with the temperature and to the effects of the variation of the index with the pressure, which itself increases with the temperature and the effects due to the gain in the material. All these effects take place along the axis of the pumping beam. The first two effects are linked with the heating of the laser material and can give rise to the formation of an optical guide by a local rise in the index of the material. The third, which preponderates in semiconductor lasers, can be sufficient to guide the pumping laser. One of the problems of all these effects is that they are difficult to control.

It is also possible to form a stable cavity by producing on the microlaser, either at the entrance or the exit, a convex face, as illustrated in FIG. 1, where reference numeral 2 designates the active medium of the microlaser, 6 an output mirror and 4 a concave, input mirror. The mirrors are obtained by dielectric deposition on the polished faces of the laser material. A pumping beam 8 penetrates the laser medium by its side having a convex face and a laser beam 10 is extracted from the laser medium by the planar face. The convex face can be obtained by polishing, which is difficult to control in the mass production of the microlaser, or by etching, which can be more easily carried out with mass production processes. The laser operating thresholds measured with these hemispherical cavities are lower than in the case of plane-plane cavity microlasers. Hemispherical cavities make it possible to obtain continuous microlasers operating with a better conversion efficiency.

A problem caused by planoconcave cavities is that this structure does not permit the production of microlasers with relatively low performance materials and/or with low power pumping means. In general terms, the efficiency levels obtained with a planoconcave cavity are inadequate.

DESCRIPTION OF THE INVENTION

The object of the present invention is to propose a cavity structure for a microlaser making it possible to increase the operating efficiency thereof and in particular permit the manufacture of microlasers with relatively low performance materials and/or with low power pumping means. This structure must also be compatible with the mass production, i.e. low cost production processes known in connection with microlasers.

The invention therefore relates to a microlaser cavity having an active laser medium and reflection means at the cavity entrance and exit, characterized in that the reflection means are dimensioned in such a way that, in the active medium, the size of a pumping beam is at the most equal to the size of the laser beam.

Thus, a structure is obtained making it possible to model the pumping and laser beams independently of the thermal effects, which makes it possible to stabilize the cavity and optimize the operating efficiency of the microlaser from the standpoint of the absorption of the pumping beam in the useful volume of the laser beam in the laser material. This leads to a rise in the extraction efficiency, which is linked with the overlap of the pumping beam and the laser beam.

In order to increase the pumping beam absorption efficiency and therefore further improve the efficiency of the device, the reflection means at the exit can be treated so as to have a maximum reflection coefficient at the wavelenngth of the pumping beam and the reflection means at the entrance can be treated so as to have a maximum transmission coefficient at the wavelength of the pumping beam and a maximum reflection coefficient at the wavelength of the laser beam. Therefore the total light quantity absorbed is further increased.

According to an embodiment of the invention, the reflection means are spherical mirrors (whose radii of curvature are calculated in such a way that the size of the pumping beam is at the most equal to the size of the laser beam in the active medium).

A secondary problem solved by the invention is that optical components of the spherical mirror type have focal characteristics which are only dependent on the radii of curvature. It can be of interest in certain cases to be able to vary the focal distance of the reflection means as a function of the wavelength. This problem is solved by using as the reflection means diffractive mirrors of the Fresnel type or holographic mirrors.

A supplementary problem can be the production of an active or passive switched mode cavity.

Thus, in order to produce a cavity of the type described hereinbefore, but operating in the active switched mode, said cavity can also integrate an electro-optical trip or release. Such trips or release are known in conjunction with microlasers, but they operate with a high operating voltage of about 1000 volts. When used in a microlaser according to the invention, the operating voltage can be reduced to approximately 100 volts.

The active laser medium can be of the four level type. It can also be of the three level type, the reflection means of the cavity being dimensioned in such a way that the size of the pumping beam is substantially equal to the size of the laser beam in the active medium.

One of the advantages of the invention is that it permits the production of microlasers with an active medium of limited thickness ($\leq 300$ μm) in the pumping beam direction.

Finally, the invention also relates to a microlaser having a cavity like that described hereinbefore and pumping means for said cavity.

BRIEF DESCRIPTION OF THE DRAWINGS

The features and advantages of the invention will become more apparent in the light of the following description of non-limitative embodiments and with reference to the attached drawings, wherein show.

DETAILED DESCRIPTION OF EMBODIMENTS

Figure 1:
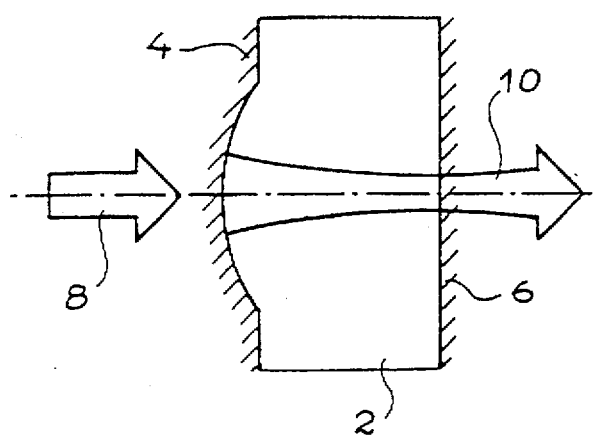
FIG. 1 A prior art planoconcave microlaser.
Figure 2:
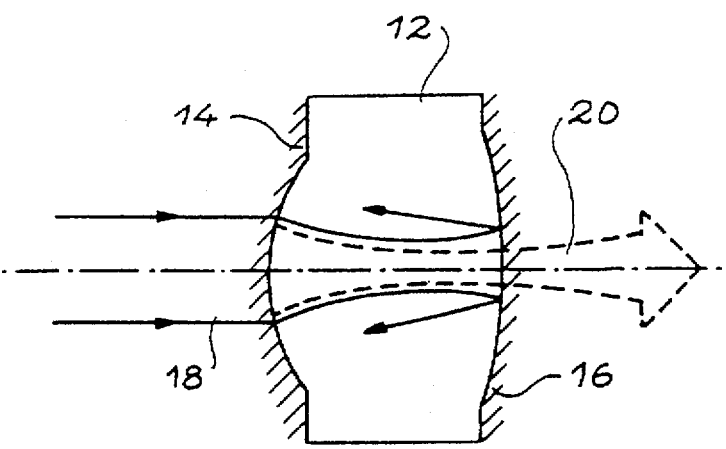
FIG. 2 A microlaser cavity according to the invention.
Figure 3:
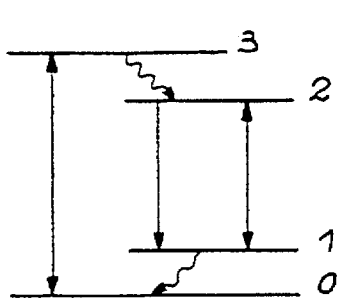
FIG. 3 The principle of operation of a laser with four levels.

A first embodiment of the invention will now be described in conjunction with FIG. 2, where reference numeral 12 designates the active medium of the microlaser and 14 and 16 its entrance and exit faces. A pumping beam is 18 and the laser beam 20. The entrance 14 and exit 16 faces are convex and deposits of dielectric coatings make it possible to form spherical mirrors on each of the said entrance and exit faces. Preferably, the mirrors obtained are dichroic mirrors having different reflection and transmission characteristics at the wavelengths of the pumping beam 18 and laser beam 20. Each of the input and output mirrors has a radius of curvature which is to be determined in such a way that the size of the pumping beam within the active material 12 is at the most equal to the size of the laser beam in said same material (so-called overlap condition).

The absorbed pumping energy quantity, which is one of the factors of the conversion efficiency of the microlaser is the result of several effects, namely the absorption properties of the laser material and the material length traversed by the pumping beam. The absorbed pumping energy quantity is proportional to $\exp(-\alpha l)$, in which $\alpha$ is the absorption coefficient of the laser material and $l$ is the traversed material length.

For a fixed material, the greater the length l the better the absorption efficiency. However, a very great length is pointless because, as from a certain point, the increase in the length leads to a negligible increase in the absorption, the energy already being almost totally absorbed.

The function of the overlap of the laser mode and the pumping beam does not have the same importance as a function of the laser type, three or four levels, or even intermediate laser systems.

Certain materials involve four spectroscopic energy levels in their laser operation principle, as illustrated in FIG. 4, namely a fundamental level 0 and three excited levels 1, 2 and 3. The pumping photons are absorbed between the fundamental level and the highest excited level (3). The active centres excited on this level are deexcited on the immediately lower level (2). It is between this level and the level above the fundamental level (1) where the laser effect takes place, as a result of radiative deexcitations of active centres by stimulated emission. The two considered levels for the absorption phenomenon (0 and 3) and the two considered levels for the stimulated emission phenomenon (1 and 2) are consequently independent. The absorption of the pump and the laser emission do not interact.

Figure 4A:
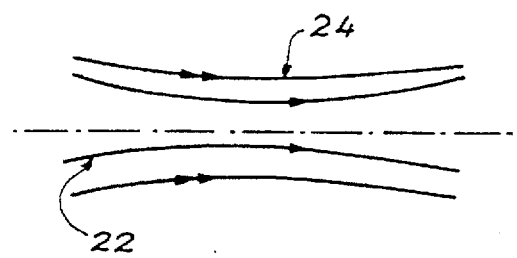
FIGS. 4A to 4D The problem of the overlap of beams in a laser with four levels.
Figure 4C:
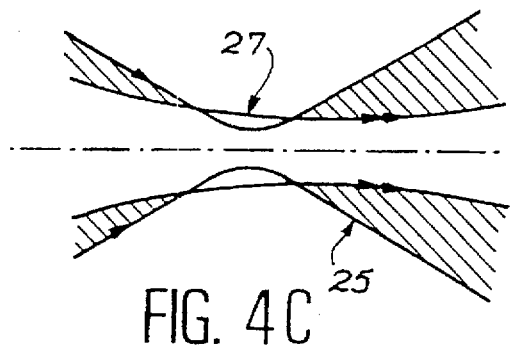
Figure 4B:
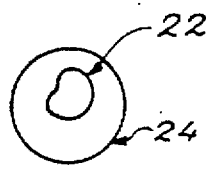
Figure 4D:
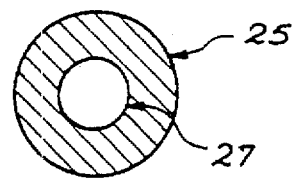

As illustrated in FIGS. 4A and 4B, when the pumping beam 22 is entirely included in the laser mode 24 ("good" overlap), all the pumping energy is absorbed in the useful volume of the laser. This energy effectively participates in the laser effect as soon as it is absorbed within the laser beam, to some extent as from the time where it is possible to ignore the parasitic thermal effects due to the heating by the pumping beam and the guidance effects by the gain. A situation of poor overlap of the beams is illustrated in FIGS. 4C and 4D, where the size of the pumping beam 25 is greater than that of the laser beam 27. The hatched portions in these drawings represent the lost pumping energy.

Figure 5:
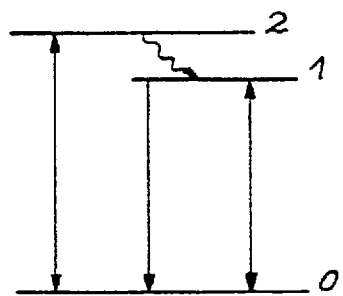
FIG. 5 The operating principle of a three level laser.

Certain materials make use of three energy levels for their laser operation as illustrated in FIG. 5. The active centres are excited by the absorption of the pump in the highest excited level (2), they are then relaxed on the immediately lower level (1). It is between the latter level and the fundamental level 0 that the laser effect takes place due to the stimulated emission of a photon when the active centres are deexcited. This also means that the laser material absorbs the photons between the fundamental level and the higher laser level (1), i.e. it reabsorbs the laser photons, which creates supplementary losses. Moreover, in order to obtain the stimulated emission, it is necessary for the higher laser level (1) to be more populated than the arrival level. This means that the fundamental level is depopulated. The absorption of the pump is reduced.

Figure 6A:
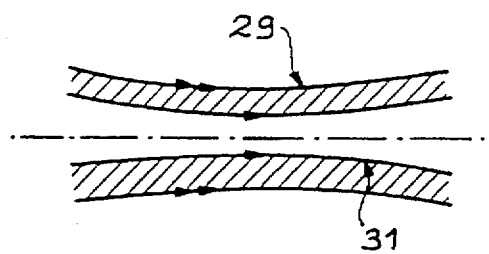
FIGS. 6A to 6D The problem of the overlap of the beams in a laser with three levels.
Figure 6C:
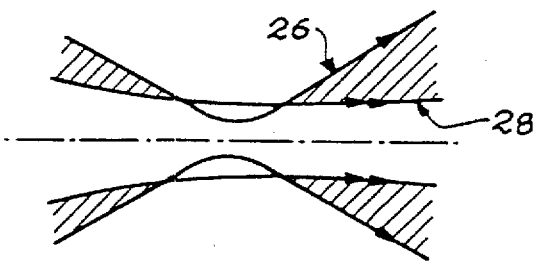
Figure 6B:
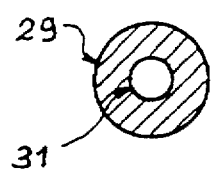
Figure 6D:
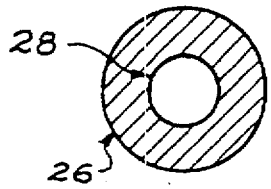

In summarizing, compared with the operation of the four level laser, two penalizing phenomena occur, namely the reabsorption of emitted photons, which leads to higher losses in the laser cavity and the saturation of the absorption of the pump leading to a reduction in the pumping light absorption efficiency. As can be seen in FIGS. 6C and 6D, if the overlap of the beams is such that the pumping beam 26 is not entirely in the laser mode 28, the energy absorbed outside the laser mode is useless. It does not participate in establishing the gain on the passage of the laser beam and this becomes all the more penalizing in the case of significant losses due to the reabsorption of the laser material. However, if, as illustrated in FIGS. 6A and 6B, the pumping beam 27 is completely in the laser mode 29 and with a significantly smaller size than that of the laser mode, two prejudicial factors must be taken into consideration, namely the zones of the laser mode where there is no absorbed pump are supplementary loss zones and attention must be paid to the saturation of the absorption of the pump. Therefore a system purely with three levels is difficult, because it is not sufficient to absorb the pump at any random point in the laser mode. It is also necessary for the size of the pumping beam to be equal or roughly equal to the size of the laser beam.

Figure 7:
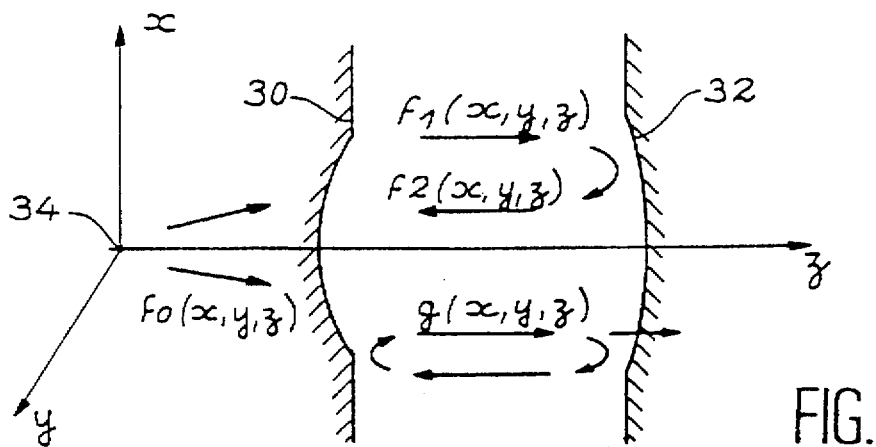
FIG. 7 The optimization principle for a microlaser according to the invention.

A general diagram for the design of an optimized efficiency microlaser according to the invention will now be given in conjunction with FIG. 7. FIG. 7 shows the particular case of a microlaser having two spherical mirrors 30, 32 illuminated by a pumping source 34, but the design can also be used for other reflection means (such as Fresnel or holographic mirrors, as will be explained hereinafter).

The pumping source emits a light wave, whose amplitude is represented by $f_0(x, y, z)$. This wave is transformed by the passage through the entrance face, its amplitude then becoming $f_1(x, y, z)$. After propagation in the microlaser of index n, the wave is reflected by the exit face and the amplitude of the pumping wave becomes $f_2(x, y, z)$. In the laser cavity, a coherent light wave oscillates between the two mirrors 30, 32 and its amplitude is $g(x, y, z)$.

In the gain medium of the microlaser, it is possible to determine the amplitude and phase of two waves (the pump and the laser). The calculation involves a first simple overlap integral R between the two waves and which is written as the sum of the product of the two waves present in the microlaser, i.e. the laser wave $g(x, y, z)$, the pumping wave on the outward path $f_1(x, y, z)$ and the pumping wave on the return path $f_2(x, y, z)$:

$$R = \int g(x,y,z)(f_1(x,y,z) + f_2(x,y,z))dxdydz$$

The other pumping waves, following a third reflection and then higher order reflections are not taken into account, because there is a virtually complete absorption on an outward and return path of the pumping beam.

The calculation of the propagation of the amplitudes of the pumping beam and the calculation of the laser beam oscillating in the microcavity can take place by applying different theories. Resolution methods can e.g. be obtained from electromagnetism, diffraction or Gaussian beam propagation equations.

Figure 8A:
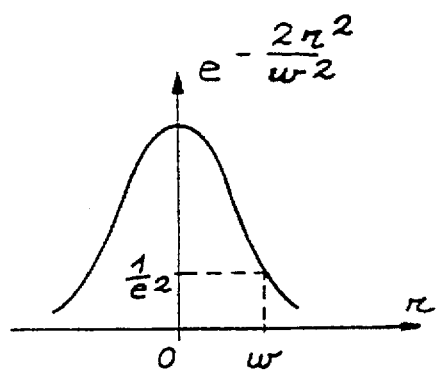
FIGS. 8A & 8B Respectively the profile and propagation of a Gaussian beam.
Figure 8B:
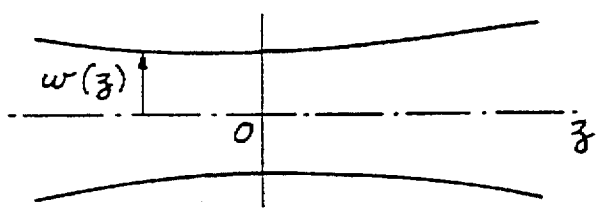

A method will now be given for the calculation of the characteristics of the microlaser cavity using the propagation of Gaussian beams. A Gaussian beam is a feature of a laser with a single transverse mode. The profile and propagation of such a beam are respectively shown in FIGS. 8A and 8B, A Gaussian beam is characterized by its wavelength $\lambda$, the position d of the waist of the beam on its axis Oz and the radius w of the beam, which is given along the propagation axis Oz by the formula:

$$Z(z) = \pi w(z)^2/\lambda \quad Z(z) = Z_0(1+(z/Z_0)^2)$$

A function Zi representing the diameter along the propagation axis for each of the three assumed coaxial beams is given by:

laser beam: $Z_1(z)$,
pumping beam on its outward path: $Z_a(z)$.
pumping beam on its return path: $Z_r(z)$.

These three functions are consequently second degree polynomials on the coordinate of axis z. The coefficients of these polynomials are real and are determined by the geometrical characteristics of the microlaser cavity and the pumping beam. In order to obtain them, use is made of the well known Gaussian beam propagation calculation method, known as the ABCD matrix method (e.g. described in the work by Anaviev "Optical resonators and divergence problems of the laser radiation", Mir Publications, Moscow, 1982). It is then found that:

$Z_1(z)$ depends on the focal distances of the micromirrors at the laser wavelength ($f_1$ and $f_2$) and the thickness of the microlaser (e), $Z_a(z)$ depends on the characteristics of the incident pumping beam (dimensions and position of the pumping source), as well as the focal distance of the input component for the pump ($f'_1$), $Z_r(z)$ depends on the characteristics of the incident pumping beam, the focal distance of the input component for the pump ($f'_1$), the thickness of the microlaser (e) and the focal distance of the reflection component of the pump ($f'_2$).

The two following polynomials respectively represent the difference, at each point of the axis, between the dimension of the laser beam and the dimension of the pumping beam respectively on the outward and return path:

$$P_a(s) = z(1(z) - Z_a(z) \quad P_r(z) = Z_1(z) - Z_r(z)$$

Compared with FIGS. 4A to 4D and 6A to 6D, which evaluate the relative positions of the laser and pumping beams, it can be seen that these two polynomials represent these positions. If they are positive, this means that the pumping beam is within the laser beam, which is sufficient in a first approximation in the case of the laser with four energy levels (FIGS. 3 and 4A to 4D). For the case of lasers with three levels (FIGS. 5 and 6A to 6D), it is also necessary for the value of the two polynomials to be as low as possible along the axis. Thus, for a laser beam greater than the pumping beam, the space between the pumping beam and the laser beam is then the source of supplementary losses and an inadequate pumping beam size and therefore a significant difference between the two beams may saturate the absorption.

These considerations can be interpreted by the following mathematical criteria, where a and b are the positions of the micromirrors or, more generally, reflection means on the axis z of the beams:

4 level criterion: local absorption in the laser beam: for $a < z < b$ $P_a(z) > 0$ and $P_r(z) > 0$ 3 level criterion: for $a < z < b$ $Pa(z) > 0$ and $P_r(z) > 0$, and minimum supplementary and saturation losses of the absorption:

$$\int_{[a,b]1} Pa(z)dz\text{minimum} \quad \int_{[a,b]} P_r(z)dz\text{minimum}$$

Using these criteria the best possible compromise can be made for the characteristics of the microlaser. In general, other considerations impose certain parameters. For example, constraints linked with the envisaged application may impose the thickness of the microlaser (if a monofrequency emission is required a maximum value is imposed and in the case of a 3 level microlaser there is an optimum length which balances the gain and the losses) or the position of the pumping source relative to the microlaser (if the microlaser is bonded to the pumping source, bare laser diode or optical fibre). Thus, the variables to be determined are:

the focal distances of the input micromirror (or more generally the reflection means at the entrance) $f_1$ and $f'_1$, the focal distances of the output micromirror (or more generally the reflection means at the exit) ($f_2$ and $f'_2$, the dimension of the pumping source, the position of the pumping source, to the extent that the source remains close to the microlaser.

With the pumping source determined (dimension, position), it is necessary to deal with the manufacturing characteristics of micromirrors.

If it is possible to solve the problem by imposing $f_1=f'_1$ and $f_2=f'_2$, this means that simple micromirrors can be used. The variables to be determined are then the radius of curvature of the input micromirror ($R_1$) and the radius of curvature of the output micromirror ($R_2$). These radii are directly obtained from the focal lengths.

The ranges of numerical values envisaged are a few millimeters for radii of curvature (from 0.5 to 5 mm). A few dozen micrometers for the dimension of the source (from 5 to 50 µm radius) and a few hundred micrometers for the cavity lengths (from 300 to 1000 µm). The source is considered to be bonded to the microlaser or focused therein.

The entrance or input face 14 of the cavity according to the invention (FIG. 2) focuses the pumping beam in the crystal. Thus, the entrance face has two separate functions for the laser mode and for the pumping beam. It is therefore advantageously coated by a dichroic dielectric treatment (e.g. maximum transmission coefficient at the wavelength of the pump and maximum reflection coefficient at the laser wavelength). The exit or output face of the microlaser also fulfils two functions respectively for the laser mode and the pump. Apart from forming the second mirror of the laser cavity, it reflects and refocuses in the crystal the energy of the pumping beam which has not been absorbed after one passage. It is therefore also advantageously coated by a dichroic treatment (maximum reflection at the pumping wavelength and optionally maximum transmission at the laser wavelength).

It may be of interest to use diffractive components in place of conventional mirrors at the entrance and exit, because these components have optical characteristics significantly varying with the wavelength, i.e. a very marked chromatism. For example, the focal distance of a Fresnel lens or holographic mirror varies directly with the wavelength, whereas a conventional mirror maintains a focal distance which is only dependent on the radius of curvature. Thus, it is possible to obtain a component, whereof not only the reflection and transmission coefficients vary for the laser and pump, but also whereof the focussing characteristics vary for the two beams.

Thus, a Fresnel lens is produced on a transparent plate giving a series of dark rings (zero transmission) alternating with transparent rings (maximum transmission). The radius of the successive rings is given by the formula:

$$rayon = \sqrt{2n\lambda \cdot f}$$

in which n is an integer, $\lambda$ the wavelength of the incident beam and f the focal length of the lens.

Therefore the calculation given hereinbefore is directly applicable, because once determination has taken place of the focal lengths of the mirrors, the radius of the successive rings is determined.

The first circular zone defined in this way can be dark or light. Its radius is a. Therefore there are rings which surround it with a progression of $\sqrt{n}$. The main focal distance of such a lens is given by:

$$f=a^2/2\lambda$$

Thus, in this formula there is a pronounced dependence of the focal length with the wavelength.

A mirror of the same type (Fresnel) is obtained using alternately reflecting and non-reflecting rings (i.e. at maximum transmission or maximum absorption, or maximum diffusion).

Holographic elements are much more developed optical components. The focal distances thereof are also $1/\lambda$ and it is consequently possible to determine their characteristics on the basis of the value of the focal distances. They are obtained by two means, mainly the experimental recording of a complex interference figure or pattern between two coherent light beams and the simulation of the interference pattern and its writing or recording by various means on a transparent plate. In both cases a plate is obtained with a very complex pattern having varied grey levels, i.e. varied transmission values. The size of the patterns is approximately the same as the wavelength used for simulation calculation or recording. These holograms are called amplitude holograms and in general have a limited overall transmission (due to inherent black zones) and they diffract several orders.

It is also possible to obtain phase holograms. They are transparent, because the pattern is a pattern which deteriorates the phase of the incident wave and not its energy. For this, it is no longer the transparency of the plate which is modulated, but instead e.g. its thickness. These holograms can then be covered with a dielectric deposit like refractive mirrors.

It is also possible to use so-called Bragg holograms. The main diffraction order concentrates the maximum light energy and is virtually the only one which is "visible", the other orders being very weak. This type of hologram has maximum efficiency conditions.

The effect of a laser cavity according to the invention (fulfilling the overlap condition) can be seen under the aspect of the energy balance. From the energy standpoint, a laser source is characterized by its laser operating threshold, which represents the minimum pumping power or energy in order to obtain the laser effect ($P_S$) and the differential efficiency ($\eta$), which gives the laser power or energy as a function of the pumping power or energy above the threshold. The overall efficiency takes account of the pumping power at the threshold, which is dependent on the total losses of the cavity, the laser spectroscopic characteristics of the laser material, the effective volume of the laser beam and the value of the pumping photon. The overall efficiency can be expressed by:

$$P_{laser}/P_{pump}=\eta-P_s/P_{pump}$$

The maximum overall efficiency which can be attained is consequently equal to the differential efficiency. When the pumping power or energy becomes high compared with their value at the threshold, this value is being approached. The differential efficiency of a laser is the product of several factors:

$$\eta=(hv_1)/(hv_p)\eta_{quant}\eta_{abs}\eta_{ext}\eta_{losses}$$

in which:

$hv_1/hv_p$ is the ratio of the energies of the photons of the laser and the pump (ratio of the wavelengths of the pump and the laser), $\eta_{quant}$ is the quantum efficiency between the excitation of an ion on the higher energy level corresponding to the absorption of a pumping photon and the deexcitation of said ion on the starting level of the laser transition (this process can be deteriorated by transitions with parasitic energy levels), $\eta_{abs}$ is the pumping light absorption efficiency corresponding to the pumping energy quantity absorbed on an overall basis throughout the laser material, $\eta_{ext}$ is the extraction efficiency linked with the overlap between the beams of the pump and the laser, which corresponds to the part of the energy absorbed and which is really used for amplifying the laser beam, $\eta_{losses}$ is a factor linked with the useful and useless losses of the laser cavity.

In the known microlasers, particularly in the planoconcave configuration, it is the value $\eta_{abs}$ which is optimized. However the microlaser according to the invention takes account of a different factor, namely $\eta_{ext}$. This is what makes it possible to optimize the energy efficiency of the microlaser.

In all cases, the solutions proposed in the present invention make it possible to determine the size of the laser beam and the pumping beam in independent manner so as to optimize the overlap of the two beams and therefore the pumping efficiency. There are in fact two parameters (e.g. the two radii of curvature in the case of spherical input/output mirrors) in order to vary the microlaser geometry.

For the production of microlasers, which would integrate within their cavity a supplementary element, such as an electro-optical release or trip with a low operating voltage, or a plate for reflecting the beam by total reflection for a release or trip by frustrated total reflection, or a compact acousto-optical release or trip, it is of interest to control the size of the beam at said element.

Two curved faces also make it possible to have a parallel or focussed beam at an element of the cavity. This is useful in the case of release by acousto-optical effect, whereof the diffraction efficiency is at an optimum level for a parallel beam.

In the case of an electro-optical release, such an element is known in conjunction with microlasers from the article by J. J. Zayhowski et al, entitled "Diode-pumped microchip lasers electro-optically Q switched at high pulse repetition rates" in Optics Letters, vol. 17, No. 17, pp 1201–1203, 1992. However, this type of device operates at a voltage of several hundred volts (in practice about 1000 V), due to an interelectrode gap of about 1 mm. With an apparatus according to the present invention, there is a reduction in the size of the beam within the laser medium, which makes it possible to use an electro-optical cell, e.g. of $LiTaO_3$ with close together electrodes and to which it is merely necessary to apply a voltage of approximately 100 V. The cost gain with respect to the apparatus is of great interest, because sophisticated electronics are then no longer necessary for the release of the electro-optical medium.

The configuration of the microlaser according to the invention allows the shaping of the pumping beam and simultaneously the laser beam with a considerable freedom range. Thus, by defining the radii of curvature of each of the terminal faces of the microlaser in an adequate manner, or more generally, the characteristics of the reflection means (Fresnel or holographic mirrors) at the cavity entrance and exit, it is possible to modify each of the two beams as a function off a desired feature of the microlaser.

The increase in the overlap of the two beams, according to the invention also makes it possible to reduce the laser operating threshold and increase the absorption efficiency of the pump and therefore the microlaser conversion efficiency.

The microlaser according to the invention remains compatible with the mass production principle ensuring that the laser system is inexpensive. This aspect will be developed hereinafter in conjunction with the description of a process for the production of a microlaser according to the invention.

The configuration of a microlaser according to the invention (i.e. satisfying the overlap condition) makes it possible to use crystals with less satisfactory laser properties from the energy efficiency standpoint, but which have a special interest. Thus, laser devices which are difficult to implement can be obtained in a geometrical configuration according to the invention. The optimized configuration makes it possible to reduce the value of the initially high laser operating threshold resulting from poor properties of the laser material. Therefore it is possible to operate microlasers of very limited thickness (e.g. below 300 or 500 um), use low absorption materials for the pumping wavelengths, use a pumping source not particularly suitable for the absorption of the laser material, or use laser systems with three energy levels or which have reabsorption at the laser wavelength.

For example thulium (Tm) doped microlasers are components having a plane-plane cavity of the high thresholds. These microlasers are almost always produced with a plane/spherical cavity and can advantageously operate with a cavity according to the invention.

In a further example, if a pumping diode of a certain power is provided and said power is not adequate to reach the operating threshold of a microlaser, it is possible to use a cavity optimized according to the invention (satisfactory overlap condition) making it possible to obtain the best possible pumping efficiency and bring about the operation of said microlaser.

In general terms, the improvement made to the overall pumping efficiency is approximately 2. In the particular case of lasers with 3 levels, not only is the differential efficiency of the laser doubled, but the laser operating threshold is reached with a power which is half as high. This is all the more important as this threshold is very high with a three level system. Thus, half the pumping power used for reaching the threshold is now sufficient to produce the laser energy with twice the efficiency.

A process for the production of a microlaser according to the invention will now described.

Microlaser production processes make use of planar microlithography methods. They are applicable to large quantities of units. This mass production makes it possible to obtain microlasers at low production costs. In order to produce microlasers with two spherical micromirrors or two Fresnel mirrors or two holographic mirrors, this low cost production concept must be retained.

The process described involves the following stages 1 to 8.

1) Choice of the substrate and structure with which it is wished to produce the microlasers. The microlasers can be produced in one piece, which consequently must be etched on two faces. Alternatively the microlasers can be produced in several pieces or blocks, which will be subsequently assembled. In this case a single face is etched on the terminal blocks or pieces of the microlasers.

Very varied laser materials are used, i.e. phosphate glass, crystals (YAG, LMA, $YVO_4$, YLF, SYS, CYS, SPF, CPF, CaSiO, ASN, ... ) and they are doped with different ions (Nd, Er, Yb, Tm, Ho, Cr). Stoichiometric materials also exist and they incorporate active ions as components of the matrix (LNP, NdPP, ... ). This makes it possible to produce microlasers emitting at several wavelengths, namely 1 µm (laser with an adequate power for marking), 1.5 and 2 µm (ocular safety wavelength for laser telemetry). Silica can also be used for producing a micromirror. Electrooptical/acoustooptical crystals can also be joined in the microlaser for obtaining a modulation thereof (pulse-type microlaser release, frequency modulation for distance and speed detection).

2) The microlaser cavity is designed according to the method described hereinbefore. For spherical mirrors, the radius of curvature thereof, the diameter, the length of the cavity of said elements are determined. Calculation also takes place of other parameters using conventional methods (reflection/transmission coefficients). The values are obtained in accordance with the applications and the envisaged device for the microlaser source.

3) The laser material is generally in the form of an ingot, which must be cut into sections. The thickness of these sections corresponds to the length of the material in the microcavity (typically 100 μm to 5 mm). The dimension of the section (diameter or side) must be compatible with the machines used in the remainder of the process, e.g. a diameter of two inches. The sections are polished on both faces.

4) The cavity is manufactured by machining its two terminal faces in accordance with the specifications given by the design. This machining involves several substages (numbered 4.1 to 4.5 hereinafter) and which will be described. Machining can be performed on the two faces of the same material or on one face of two materials which will then be assembled. This is followed by the production of the first mirror.

4.1. Firstly definition takes place of a mask permitting the obtaining of the desired mirror shape. A mask with two black and white levels or a variable density grey mask can be used. The mask is calculated and designed as a function of the aperture, the focal distance and all the desired parameters for the micromirror.

4.2. A correctly chosen resin is spread on the substrate using a whirler.

4.3. The resin is then irradiated through the mask (UV light).

4.4. This is followed by the development of the resin and all that is left consists of resin reliefs, whose shape and arrangement correspond to what has been defined by the mask. If the mask is a variable density mask, the desired mirror shape is reproduced in the resin layer. If the mask has two values, a relief in the form of isolated plates of the same height is obtained. The substrate is then raised to a certain temperature, so that resin spots start to melt. The surface tension of the melted resin gives a quasi-spherical shape to the spot. This shape hardens and sets when the substrate is cooled.

4.5. The resin shape is transferred into the substrate by etching the plate. The etching method is adapted as a function of the substrate (ionic etching, reactive etching, dry etching, etc.). The etching selectivity between the resin and the substrate material makes it possible to correct the resin relief shape.

For producing the second mirror the same procedure is used. If the machining of the second mirror takes place on the same section as the first mirror, the mask of the second mirror must be aligned with the pattern obtained for the first mirror. This mask alignment takes place in most masking machines. If the second mirror is produced on a substrate different from that of the first mirror, the alignment will take place during the assembly stage.

The microlenses or micromirrors can be directly etched in the laser crystal or in general in the terminal components closing or sealing the laser cavity. If the etching of the material is too difficult, it is always possible to join to the laser crystal or the terminal component the micromirror, after the latter has been produced on a substrate allowing etching (e.g. silica).

Thus, two spherical mirrors are produced for the microlaser. Preferably the mirrors are aligned on the same axis, which simplifies the installation with the microlaser pumping source, but is not necessary for the actual operation of the laser. In the case where the microlenses are produced by direct etching, said lignment can effectively be carried out during the photolithography stages by aligning the masks. If not, the alignment will be carried out on installing the plate of the micromirrors on the laser material plate or the like using an optical method. In this case, it is necessary to provide reference marks on the plates, so as to e.g. align them with the microscope.

5) The mirrors forming the cavity have now the desired shape, so that using vacuum reflecting treatments will be carried out so as to give the faces of the mirrors the desires reflection and transmission coefficients at the pumping and laser wavelength.

6) The plates are assembled if the microlaser is formed from several elements, by bonding using an optical adhesive or other processes. It is necessary to respect the alignment of the elements, particularly with regards to the two micromirrors.

7) Finally, the plate obtained passes to the individual laser chip cutting stage using a diamond blade or a wire saw. The typical dimensions of the chips are $1 \times 1$ mm$^2$.

8) The laser chips or microlasers are fitted at the end of an optical fibre, bonded to a bare laser diode or are fitted in a mechanical part. Everything can be encapsulated in a hermetically sealed case. The fitted microlasers are tested under pumping conditions determined at the design stage.

The aforementioned stages related to the production of a microlaser according to the invention, the reflecting means defining the cavity being spherical micromirrors.

In the case where the diffractive elements (Fresnel or holographic mirrors) are used, the main stages 1–3 and 6–8 still apply. The diffractive elements can be produced according to one of the processes described in the article by C. LIEGOIS entitled "Les optiques holographiques", published in Opto, No. 67, May/June 1992, pp 28–34.

The Fresnel mirrors can e.g. be produced by the direct etching of a terminal, planar face of the microlaser in an identical manner to the etching of the microlenses.

The holographic components can be produced with the aid of masks designed in accordance with existing codes, cf. e.g. the article by A. Bruel et al entitled "Calcul digital d'hologrammes", published in Nouvelle Revue d'Optique Appliquée", 1970, vol. 1, No. 5, pp 325–332, followed by the deposition of a coating of e.g. photosensitive emulsion, the writing or recording of the hologram (exposure) and the development of the hologram (e.g. photographic type).

The applications of this novel optimized microlaser are at least the same at those of the existing microlaser. The following list does not claim to be exhaustive;

power injection in laser systems, detection of chemical species: gases, pollutants, etc., helium magnetometry, telemetry: detection of obstacles for cars, portable telemeter, etc., microlidar, micromarking of industrial parts.

The field of application of this optimized microlaser is even wider as a result of the possibility of producing cavities using laser materials of all types with better performance characteristics:

laser with three levels in general laser system with reabsorption at the laser wavelength), such as e.g. erbium-doped lasers with ocular safety, laser material with a broad emission band generally having a small effective, stimulated emission cross-section, but which can permit the production of tunable sources.

In the same way, the complete determination of the geometry of the Fabry-Perot resonator gives a certain control on the shape of the laser beam, which is an important advantage in numerous applications, such as telemetry or industrial marking.

We claim:

1. A monolithic microlaser cavity, comprising:

an active laser medium;

pump input means for inputting a pumping beam into said active laser medium; and first and second spherical mirrors respectively located at an entrance and exit of the microlaser cavity;

each of said first and second spherical mirrors having a focal length which defines a size of a pumping beam within the active laser medium, said focal lengths of said first and second spherical mirrors being selected such that, for a given mirror separation and for a given active laser medium, said first mirror focuses said pumping bean in the active medium and said second mirror reflects and refocuses in the active medium the energy of the pumping beam which has not been absorbed after passing through the active laser medium, said second mirror refocusing the pumping beam to have a size in the active medium at most equal to a size of a laser beam oscillating in the active medium so that said pumping beam is entirely overlapped by said laser beam oscillating within said active laser medium thereby to increase operating efficiency of said microlaser cavity.

2. The monolithic microlaser cavity according to claim 1, wherein the first spherical mirror at the microlaser cavity entrance has a maximum transmission coefficient at a wavelength of the pumping beam and a maximum reflection coefficient at a wavelength of the laser beam emitted by the microlaser cavity.

3. The monolithic microlaser cavity according to one of the claims 1 or 2, wherein the second spherical mirror at the microlaser cavity exit has a maximum reflection coefficient at a wavelength of the pumping beam.

4. The monolithic microlaser cavity according to one of the claims 1 or 2, further comprising:

an electrooptical switching element with a low-operating voltage.

5. The monolithic microlaser cavity according to one of the claims 1 or 2, wherein the active laser medium comprises a four level medium.

6. The monolithic microlaser cavity according to one of the claims 1 or 2, wherein the active laser medium comprises a three level medium and the focal lengths of the first and second spherical mirrors are such that a size of the pumping beam is substantially equal to a size of the laser beam in the active laser medium.

7. The monolithic microlaser cavity according to one of the claims 1 or 2, wherein the active laser medium has a thickness of less than 300 μm in a direction of the pumping beam.

8. A microlaser, comprising:

a monolithic microlaser cavity according to one of the claims 1 or 2; and means for pumping said microlaser cavity.

9. A monolithic microlaser cavity, comprising:

an active laser medium;

pump input means for inputting a pumping beam into said active laser medium; and first and second Fresnel mirrors respectively located at an entrance and exit of the microlaser cavity;

each of said first and second Fresnel mirrors having a focal length which defines a size of a pumping beam within the active laser medium, said focal lengths of said first and second Fresnel mirrors being selected such that, for a given mirror separation and for a given active laser medium, said first mirror focuses said pumping beam in the active medium and said second mirror reflects and refocuses in the active medium the energy of the pumping beam which has not been absorbed after passing through the active laser medium, said second mirror refocusing the pumping beam to have a size in the active medium at most equal to a size of a laser beam oscillating in the active medium so that said pumping beam is entirely overlapped by said laser beam oscillating within said active laser medium thereby to increase operating efficiency of said microlaser cavity.

10. The monolithic microlaser cavity according to claim 9, wherein the first Fresnel mirror at the microlaser cavity entrance has a maximum transmission coefficient at a wavelength of the pumping beam and a maximum reflection coefficient at a wavelength of the laser beam emitted by the microlaser cavity.

11. The monolithic microlaser cavity according to one of the claims 9 or 10, wherein the second Fresnel mirror at the microlaser cavity exit has a maximum reflection coefficient at a wavelength of the pumping beam.

12. The monolithic microlaser cavity according to one of the claims 9 or 10, further comprising:

an electrooptical switching element with a low-operating voltage.

13. The monolithic microlaser cavity according to one of the claims 9 or 10, wherein the active laser medium comprises a four level medium.

14. The monolithic microlaser cavity according to one of the claims 9 or 10, wherein the active laser medium comprises a three level medium and the focal lengths of the first and second Fresnel mirrors are such that a size of the pumping beam is substantially equal to a size of the laser beam in the active laser medium.

15. The monolithic microlaser cavity according to one of the claims 9 or 10, wherein the active laser medium has a thickness of less than 300 μm in a direction of the pumping beam.

16. A microlaser, comprising:

a monolithic microlaser cavity according to one of the claims 9 or 10; and means for pumping said microlaser cavity.

17. A monolithic microlaser cavity, comprising:

an active laser medium;

pump input means for inputting a pumping beam into said active laser medium; and first and second holographic mirrors respectively located at an entrance and exit of the microlaser cavity;

each of said first and second holographic mirrors having a focal length which defines a size of a pumping beam within the active laser medium, said focal lengths of said first and second holographic mirrors being selected such that, for a given mirror separation and for a given active laser medium, said first mirror focuses said pumping beam in the active medium and said second mirror reflects and refocuses in the active medium the energy of the pumping beam which has not been absorbed after passing through the active laser medium, said second mirror refocusing the pumping beam to have a size in the active medium at most equal to a size of a laser beam oscillating in the active medium so that said pumping beam is entirely overlapped by said laser beam oscillating within said active laser medium thereby to increase operating efficiency of said microlaser cavity.

18. The monolithic microlaser cavity according to claim 17, wherein the first holographic mirror at the microlaser cavity entrance has a maximum transmission coefficient at a wavelength of the pumping beam and a maximum reflection coefficient at a wavelength of the laser beam emitted by the microlaser cavity.

19. The monolithic microlaser cavity according to one of the claims 17 or 18, wherein the second holographic mirror at the microlaser cavity exit has a maximum reflection coefficient at a wavelength of the pumping beam.

20. The monolithic microlaser cavity according to one of the claims 17 or 18, further comprising:

an electrooptical switching element with a low-operating voltage.

21. The monolithic microlaser cavity according to one of the claims 17 or 18, wherein the active laser medium comprises a four level medium.

22. The monolithic microlaser cavity according to one of the claims 17 or 18, wherein the active laser medium comprises a three level medium and the focal lengths of the first and second holographic mirrors are such that a size of the pumping beam is substantially equal to a size of the laser beam in the active laser medium.

23. The monolithic microlaser cavity according to one of the claims 17 or 18, wherein the active laser medium has a thickness of less than 300 µm in a direction of the pumping beam.

24. A microlaser, comprising:

a monolithic microlaser cavity according to one of the claims 17 or 18; and means for pumping said microlaser cavity.

* * * * *